Oct. 1, 1935.  F. W. MACKENZIE  2,016,014
VISUAL COMPARATOR
Filed Dec. 28, 1931   2 Sheets-Sheet 1
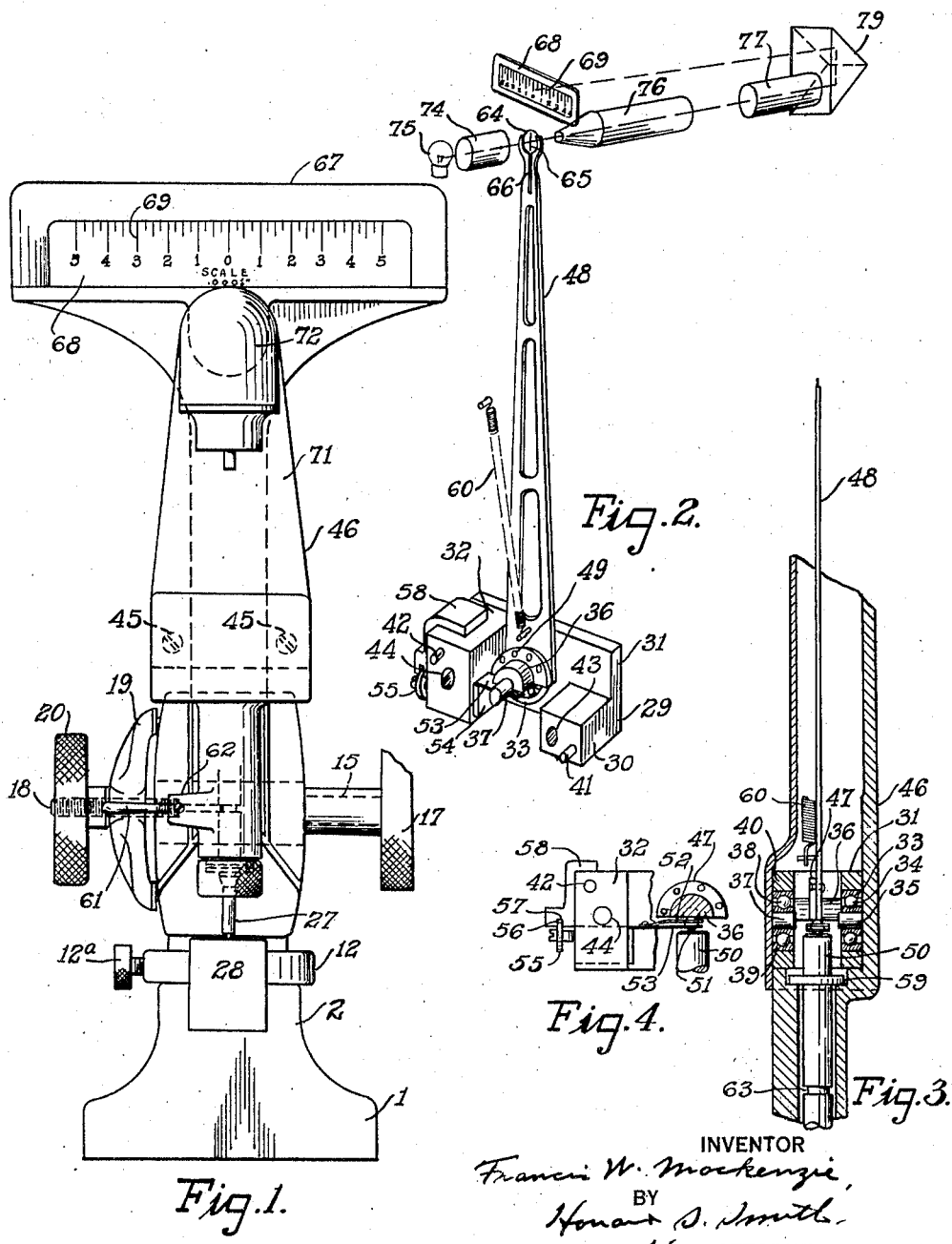

Oct. 1, 1935.  F. W. MACKENZIE  2,016,014
VISUAL COMPARATOR
Filed Dec. 28, 1931  2 Sheets-Sheet 2
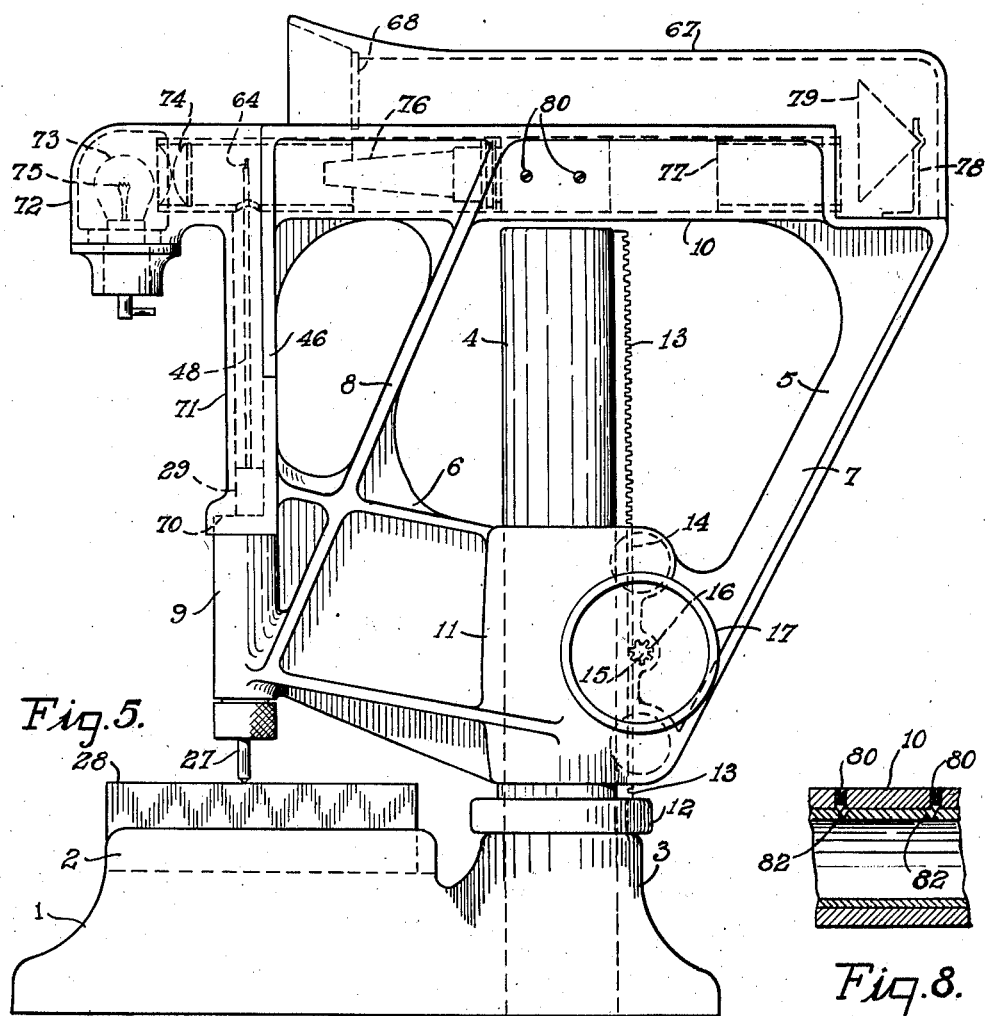
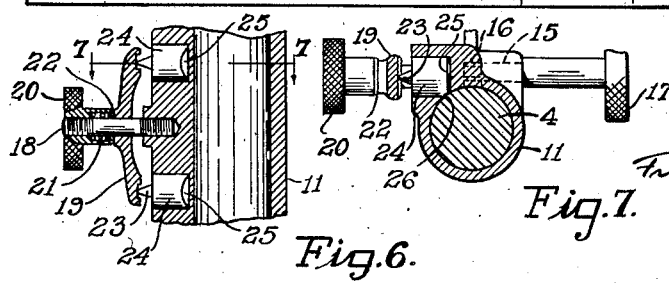

Patented Oct. 1, 1935

2,016,014

UNITED STATES PATENT OFFICE 2,016,014

VISUAL COMPARATOR

Francis W. Mackenzie, Dayton, Ohio, assignor to The Sheffield Machine and Tool Company, Dayton, Ohio, a corporation of Ohio Application December 28, 1931, Serial No. 583,499

2 Claims. (Cl. 33—147)

This invention relates to new and useful improvements in visual comparators.

It is one of the principal objects of the invention to provide simple, accurate and efficient means for gaging objects and amplifying their dimensions upon an illuminated indicator, such as a glass screen.

Another object of my invention is to provide on the free end of the indicator needle a glass target containing an engraved line impervious to light rays for projection in a magnified state upon a calibrated screen. Thus, by its position upon the screen, this target line, which varies in accordance with the dimension of the article being gaged, will indicate that dimension in a highly amplified manner without eye strain.

Due to the light weight of its moving parts and its simplicity of construction, my instrument provides a speedy, reliable and accurate comparator having the capacity to constantly repeat the accurate measurement of a given standard or size block, and do so with great speed when operated by regular production help.

It is another object of my invention to provide a comparator which is readily adjustable for greater or less amplification.

Other important and incidental objects will be brought out in the following specification and particularly set forth in the subjoined claims.

In the accompanying drawings illustrating my invention, Figure 1 is a front view of my complete visual comparator. Figure 2 is a schematic view in perspective of the amplifying means.

Figure 3 is a sectional view taken through the indicator pivot mechanism on the center line thereof. Figure 4 is a detail view of the means for obtaining a desired ratio of movement of the indicator needle with respect to the movement of its operating plunger. Figure 5 is a side view of the complete device. Figure 6 is a detail view of the clamping means for holding the comparator head in an adjusted position above the anvil. Figure 7 is a cross-sectional view of said clamping means, taken through the column on the line 7—7 of Figure 6. And Figure 8 is a focusing means for the objective mounting.

In a detailed description of my invention, the numeral 1 designates a base having an anvil supporting portion 2 and an offset portion 3 containing a bore to receive a column 4. Vertically movable along the column 4 is a head 5.

The head 5 is preferably a one-piece casting formed as shown in Figures 1 and 5, with an inclined base portion 6, upwardly inclined webs 7 and 8, a front plunger bearing portion, a housing 10 for the optical system, and a central sleeve portion 11 which is slidable along the column 4.

Secured for rotation on the top portion of the neck 3 of the base 1, is a bronze collar 12 formed with a slot to receive the lower end of a rack 13 that projects to the top of the column in close contact therewith. This collar is held in an adjusted position by a thumb screw 12a. The rack 13 projects through a vertical slot 14 in an offset portion of the sleeve 11.

Rotatable in a reamed hole in the sleeve portion 11 of the head 5, is a shaft 15 carrying within the slot 14 a pinion 16 which engages the rack 13 to elevate or lower the head when an adjustment wheel 17 on the end of the shaft is turned.

For the purpose of clamping the head 5 in an adjusted position upon the column 4, I have provided the following means. Referring to Figures 1 and 6, the numeral 18 designates a clamp stud which is screwed into a threaded hole in the sleeve 11 of the head 5 to carry an equalizer 19.

At its outer end the stud 18 carries a clamp wheel 20 that is counterbored to receive a compression spring 21 which exerts pressure on a washer 22. The spring 21 and washer 22 which surround the stud 18, exert pressure on the equalizer 19 whose ends are recessed to press on the conical points 23, 23 of conical studs 24, 24 respectively. These studs 24, which are free to move in radial holes in the sleeve portion 11 of the head 5, are formed with heels 25 that cause the pressure of arc portions 26 on them to be exerted against the column 4 to clamp the head 5 in an adjusted position upon it. The spring 21 permits the head to be raised or lowered on the column when the clamp wheel 20 is loosened a part of one turn and at the same time takes up all initial slackness of the various members of the unit.

Vertically movable in the bearing portion 9 of the head 5 is a plunger 27 whose lower end is directly above an anvil 28 mounted upon the anvil supporting portion 2 of the base 1.

At its upper end the bearing portion 9 terminates in an offset seat for an indicator needle supporting casting 29. The latter comprises a spacing block 30 integral with a plate 31 which projects above and a substantial distance to the left of it, there being secured to its left side a spacing block 32 that is taller than the block 30. (See Figure 2.)

Fitted in a bore in the lower middle portion of the plate 31 is a race 33 containing ball bearings 34 for a journal 35 on one end of a pivot segment 36. On the other end of this segment there is a journal 37 which is received by ball bearings 38 in a race 39 fitted in a bore in the lower middle portion of a plate 40 which is correctly applied to the front faces of the blocks 30 and 32 by dowels 41 and 42 respectively. Holes 43 and 44 in the blocks 30 and 32 respectively register with similar holes in the plates to receive screws 45 for securing the plate unit to the upper web extension 46 of the bearing portion 9 of the head 5.

Provided on the middle portion of the pivot segment 36 is a sector flange 47 to which the lower end of a needle 48, preferably constructed of aluminum is attached by fastening means such as rivets 49.

A variable contact in the form of the following means is interposed between the upper end 50 of the plunger and the flat undersurface of the segment 36. Referring to Figures 2, 3 and 4, the numeral 51 designates a ball which is held between two flat springs, one spring 52 being fastened to the other spring 53 to clear a cylindrical holder slide 54 to which the latter spring is secured. At their outer ends these springs are formed with holes of less diameter than the ball to securely hold it for adjustment toward and away from the central axis of the pivot segment 36 in a line at right angles to said axis. This adjustment is effected by a screw 55 which enters a threaded hole in the slide block 54 to which the inner end of the spring 53 is secured. Secured on the outer end of this screw is a thrust collar 56 which is received by a groove 57 in the bottom of a yoke 58 secured to the spacing block 32 to anchor the screw to the latter when the screw is turned.

By adjusting this screw 55, the degree of amplification of the indicator needle 48 can be varied for the same degree of upward movement of the work plunger, since the longitudinal movement of that screw will draw the contact ball 51 toward and away from the central axis of the pivot segment to which the needle is attached.

Secured to the upper end 50 of the work plunger 27 is a collar 59, which is free to engage the lower edges of the plates 31 and 40 to prevent an upward travel of the plunger that would be so extreme as to overload the ball bearings 34 and 38.

Secured to a projection on the lower part of the indicator needle 48 is a projection to which there is secured one end of a return or bias spring 60. The opposite end of this spring is attached to the web 46 at a point where it will always return the needle to a starting position and constantly maintain a load on the ball bearings in a direction of the thrust of the work plunger 27, thereby causing the instrument to register accurately with loose bearings.

For the purpose of raising the plunger 27 above the object to be gaged, various means may be employed. The means I have illustrated is a lever 61 which is pivotally secured within a boss 62 on the bearing portion 9 of the head 5. The inner end of this lever enters a circumferential groove 63 in the plunger to raise and lower it when desired.

Mounted on the end of the needle 48 at the point of highest amplification is a glass target 64 on which there is an opaque engraved line 65 impervious to light rays. This target is mounted in a circular V groove in the end of the needle, being held firmly in place therein by the elasticity of its two end portions formed by a dividing slot 66.

Secured in the front portion of an elongated hood 67 mounted on the top of the head 5 is a ground glass screen 68 upon which is inscribed a scale 69 which has calibrated tolerance limits for the dimensions of the article to be gaged. For the purpose of projecting the magnified image of the opaque line 65 upon this screen to enable the operator to read the comparative size of the work in relation to a standard gage block, I have provided the following means.

Fitted over the needle mechanism for removable support upon the ledge 70 provided by the bearing part 9 of the head 5, is a front cover 71 preferably constructed of aluminum. At its upper end this cover is formed with an outwardly and downwardly projecting hollow head portion 72 containing a source of light such as the incandescent lamp 73. Mounted in the head portion of the cover 71 between the lamp 73 and the target 64 is a condensing lens 74 for collecting the rays of light emitted by the filament 75 of the lamp 73. (See Figures 1 and 2.)

Secured in the housing 10 immediately behind the target 64 is an adjustable projection objective 76 covered by the hood 67. The rays of light that pass through the target 64 from the lamp 73 are focused into this objective and further magnified by a compensated eye-piece 77 positioned at the rear thereof.

Supported in the rear portion of the hood 67 by a bracket 78 is a prism 79 which will reflect the beam of light upward and back to the graduated glass screen 68 to enable the operator to read thereon the magnified image of the index line 65.

The objective mounting 76 is adjusted and locked in focus by means of taper screws 80 which project through a side wall of the housing 10 into tapered holes 82 in the objective. (See Figure 8.)

On the scale 69 of the screen 68 there are a plurality of vertical main division lines, indicated as 1 to 5, each of which representing .0001" of tolerance limits and extending in each direction from a central or zero point, each main division being divided into four parts representing .000025". These divisions on the left of the zero point are indicated as minus, and on the right as plus, to designate undersize and average tolerance limits, respectively, for the dimensions being gaged.

When an object to be gaged is placed in position between the anvil 28 and the plunger 27, the needle 48 will be deflected so that the magnified image of the target line 65 will stop at a point on the graduated screen 68 that will indicate within a millionth of an inch whether the dimension of the article is within the predetermined limits set by the standard gage block.

Having described my invention, I claim:

1. In an object gaging device of the type described, a support, an indicating member pivoted at one end to said support, a plunger between the object to be gaged and the said end of the pivoted indicating member for causing an amplified movement of said member corresponding to a variation in the dimension of the object, a ball, an adjustable slide in said support, and a flat spring secured at one end to said slide and formed at its other end with a hole of less diameter than the ball to hold the latter in an adjusted position between the adjacent end of the plunger and the indicating member to vary the ratio of amplification of its movement to the plunger.

2. In an object gaging device of the type described, a support, an indicating member pivoted at one end to said support, means for causing an amplified movement of said indicating member corresponding to a variation in the dimension of the object being gaged, a transparent target carried by the free end of said indicating member, a calibrated glass screen mounted on said support above the target, an index line upon said target, a vertical cover for the indicating member, an electric lamp on said cover in front of the target, a condenser on said cover between the target and the lamp, to collect the rays of light emitted by said lamp and focus them through the target, a projection objective mounted on said support behind the target, into which the rays of light are focused, a compensated eyepiece mounted on said support behind the objective to magnify said rays, and a prism mounted on said support behind the eyepiece to project the illuminated index line upward and back upon the calibrated screen for the purpose specified.

FRANCIS W. MACKENZIE.